United States Patent Office 3,137,473
Patented June 16, 1964

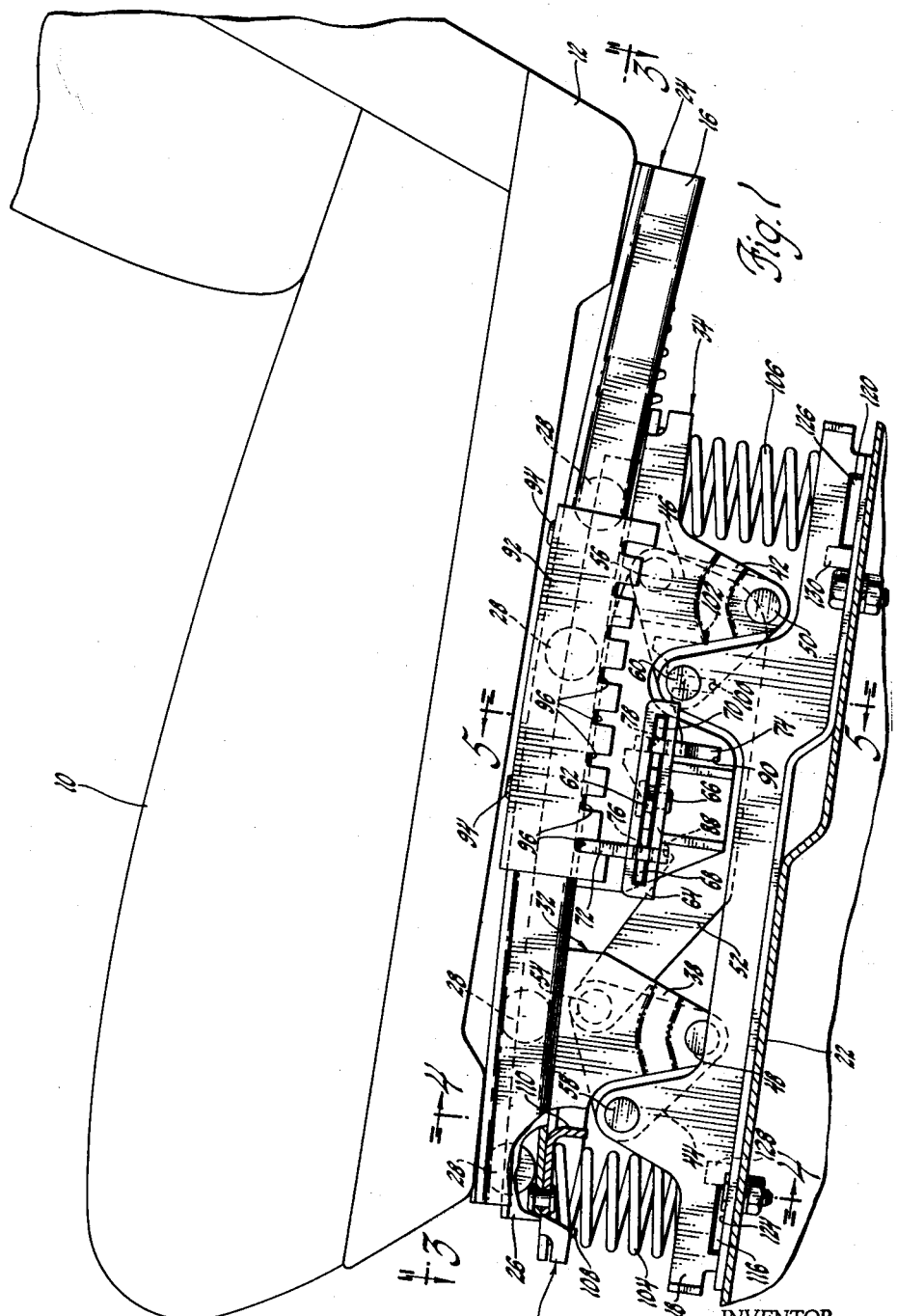

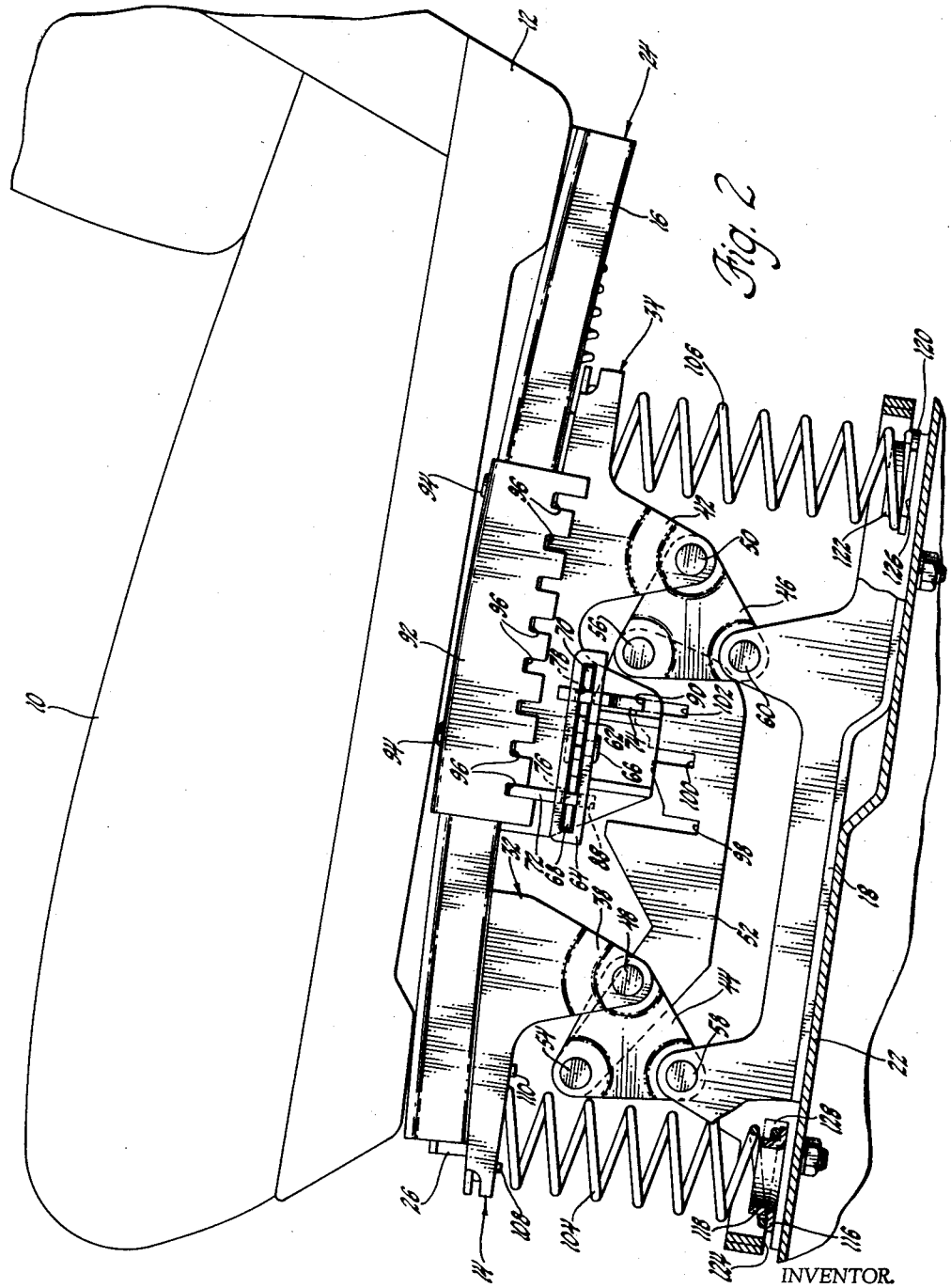

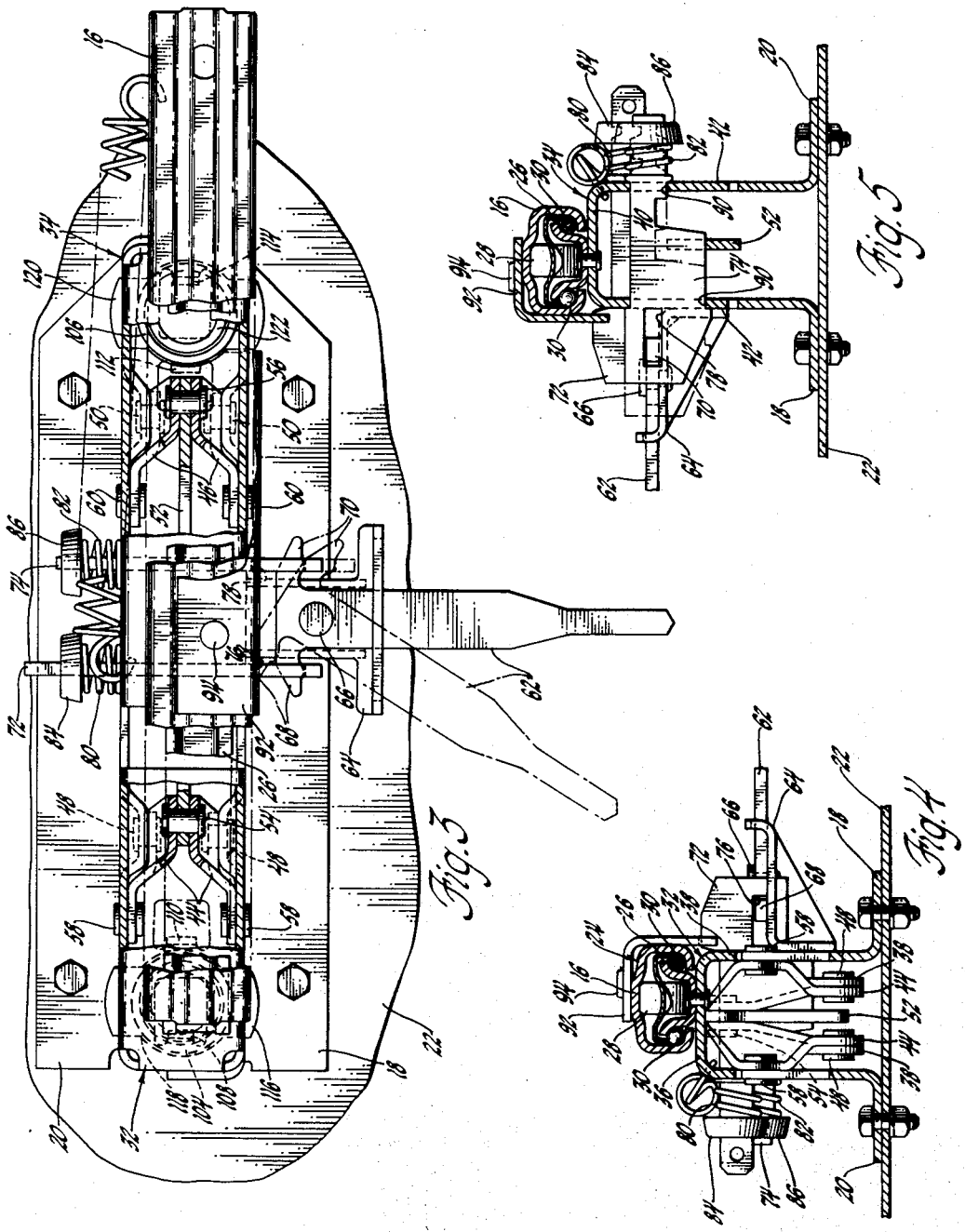

3,137,473
VEHICLE SEAT ADJUSTER
Algis George Augunas, Detroit, Mich., assignor to General Motors Corporation, Detroit, Mich., a corporation of Delaware
Filed Feb. 9, 1962, Ser. No. 172,244
6 Claims. (Cl. 248—419)

This invention relates to vehicle seat adjusters and more particularly to a vehicle seat adjuster which provides for vertical and horizontal seat adjustment and latching means to hold the seat mounted thereon in certain desired positions.

The present trend in vehicle seat adjusters has been to provide a power train to move the vehicle seat adjusters to their various vertical and horizontal positions. Such seat adjusters are expensive and require excessive space beneath the seat for the installation of the power equipment.

An object of the present invention is to provide an improved compact seat adjuster.

Another object of this invention is to provide an improved manually operated four-way seat adjuster which allows easy fore and aft or up and down movement of the seat.

A further object is to provide a four-way seat adjuster having a first mechanism for regulating the up and down movement of a seat, a second mechanism for regulating the fore and aft movement of the seat and an improved latching means for securing the mechanisms in their desired positions, the seat adjuster being of simple construction, low in cost and easy to operate.

These and other objects, advantages and features of the invention will become more fully apparent as reference is had to the accompanying specification and drawings wherein:

FIGURE 1 is a side elevational view of the unique seat adjuster in the down position having a seat supported thereon.

FIGURE 2 shows the side elevation view of the seat adjuster and seat in the fully up position.

FIGURE 3 is a plan view, partly in section, of the vehicle seat adjuster taken generally in the direction of the arrows 3—3 in FIGURE 1. The unlatched position of the vertical adjusting mechanism latch is illustrated by the phantom lines in this figure.

FIGURE 4 is a view taken substantially along the line 4—4 of FIGURE 1 with parts in section and broken away showing the vertical adjusting mechanism in the fully down position.

FIGURE 5 is a sectional view taken generally along the line 5—5 of FIGURE 1 and illustrating the latch members for the vertical seat adjusting mechanism.

It is to be understood that seat adjusters of this type can be used singularly or in pairs and for ease of explanation only a left hand adjuster will be described. Parts for seat adjusters are made from sheet metal stampings and often for strength requirements two links are used which perform a parallel identical movement and function. In this description, one reference numeral will be used to identify parallel links or rivets.

Referring now to the drawings, and particularly FIGURES 1 and 2, there is shown a vehicle seat 10 mounted on a frame 12, supported by the unique seat adjuster unit indicated generally by numeral 14. The seat adjuster 14 has an upper support member 16 secured by rivets or other suitable means to the seat frame 12 and a pair of right and left hand L-shaped stools or lower support members 18, 20 which are supported on the floor 22 of a vehicle. The stools 18, 20 are secured to the vehicle floor 22 by bolts or other suitable means. If the vehicle floor were flat, a single channel member could replace the pair of stools.

The seat adjuster 14 consists of two mechanisms, a first mechanism regulates the fore and aft movement and a second mechanism regulates the up and down movement of the seat.

The first mechanism for fore and aft movement is essentially a conventional horizontal seat adjuster mechanism indicated generally by the numeral 24. The horizontal seat adjuster mechanism 24 consists of an upper C shaped track which also serves as the upper support member 16 and a lower generally U shaped track 26. The tracks 16, 26 are held in space relationship to each other by roller bearings 28 and ball bearings 30 which reduce the friction between the tracks during their movement relative to each other. The upper track or support bracket 16 as previously stated is secured to the seat frame 12. The lower track 26 is secured to two U shaped support channels, 32 at the front and 34 at the rear, which are part of the second mechanism for up and down adjustment. Movement of the upper track 16 relative to the lower track 26 provides horizontal adjustment of the seat in the fore and aft direction. General features of the seat adjuster so far described comprise no part of the present and the assembly will be recognized by those skilled in the arts as of a type now commonly employed.

The linkages of the second mechanism for up and down movement can best be seen in FIGURES 1 and 2 with occasional references to FIGURES 4 and 5 for the cross-sectional views. The front support channel 32 has a web section 36 with depending arms 38. The rear support channel 34 has a web section 40 with depending arms 42. The depending arms 38, 42 are pivotally connected to front bellcrank 44 and rear bellcrank 46, respectively, by rivets 48, 50. To keep the bellcranks 44, 46 in phase, a connecting link 52 is pivotally connected between the bellcranks by rivets 54, 56. The fulcrum of the front bellcrank 44 is pivotally connected to the stools 18, 20 by rivets 58 and the fulcrum of the rear bellcrank 46 is similarly connected to the supporting stools 18, 20 by rivets 60.

Vertical movement is accomplished by the pivoting of bellcranks 44, 46 about their fulcrums 58, 60. From the extreme down position as shown in FIGURE 1, the bellcranks 44, 46 rotate counterclockwise about their fulcrums 58, 60 to the fully up position as shown in FIGURE 2. The movement of the bellcranks 44, 46 are co-ordinated by connecting link 52 so that one bellcrank cannot get out of phase with the other, thus assuring a uniform vertical movement of the seat. As the bellcranks 44, 46 pivot about their fulcrums the upper support channels 32, 34 are raised in a vertical direction by the support arms 38, 42 pivoting at points 48, 50 as the bellcranks 44, 46 move counterclockwise. In this manner, the seat is moved up or reversing the movements, down. When the connecting link 52 is blocked from moving, other parts of the vertical linkage cannot move.

Referring now to FIGURES 2 and 3, the latching mechanism for this four-way seat adjuster is controlled by a single handle 62. The handle 62 is pivotally connected to a supporting bracket 64 by rivet 66. Supporting bracket 64 is secured by welding or other suitable means to the upper rear supporting channel 34. The contact end of the handle 62 has two arms 68, 70 which are used to control latching bars 72, 74. The latching bar 72 which is used to secure the fore and aft adjusting mechanism has an opening 76 to receive the arm 68 and the latching bar 74, which is used to secure the up and down adjusting mechanism, has an opening 78 to receive the arm 70. The latching bar 72 is spring biased toward locking position by compression spring 80 and latching bar 74 is spring biased toward locking position by compression spring 82. The compression springs are held in place on the latching bars by retainer washers 84, 86, respectively. The latching bars 72, 74 are positioned in the depending arms 42 of the rear support channel 34 by slots 88, 90, respectively.

The handle 62 is held in a neutral position by the force exerted on the arms 68, 70 by the latching bars 72, 74 which are urged away from the handle by their compression springs 80, 82.

The latching means for the horizontal seat adjuster mechanism further includes an L shaped plate 92 which is secured to the upper track 16 by rivets 94 and is formed with a plurality of keeper notches 96 along its lower edge.

To secure the upper track 16 from movement relative to the lower track 26, the latching bar 72 cooperates with the keeper notches 96 blocking relative movement of the tracks 16, 26. For horizontal adjustment, the handle 62 is pivoted to the rear about rivet 66; thus, the arm 68 cooperating with the opening 76 moves the latching bar 72 out of engagement with the keeper notch 96; thus freeing the upper track 16 to move relative to the lower track 26. When the desired horizontal position is reached, the handle 62 is released and the spring 80 biases the latching bar 72 into engagement with the appropriate keeper notch 96 to secure the tracks 16, 26 from further movement.

The latching means for the up and down adjusting mechanism consists of the latching bar 74 which cooperates with the keeper notches 98, 100, 102 formed in the connecting link 52. To move the locking bar 74 out of engagement with the connecting link 52, handle 62 is pivoted about rivet 66 in a forward direction to a position as illustrated by the phantom lines in FIGURE 3. As seen in FIGURE 5, when the latching bar 74 is moved out of engagement with one of the keeper notches, as in the position illustrated by the phantom lines, the vertical linkages are then free to move. When the desired position has been reached, the handle 62 is released and the compression spring 82 will move the locking bar 74 into engagement with the appropriate keeper notches 98, 100 or 102 located in the connecting link 52. Only three keeper notches are shown in this drawing. However, should more or less keeper notches be deemed necessary, they could be added or subtracted without difficulty. The number of keeper notches in the connecting link 52 determines the number of positions available in up and down adjustment.

For upward adjustment the handle 62 is moved forward and upward pressure is applied to the handle. The seat adjuster is moved in a vertical direction to its desired position at which time the handle 62 is released. When the handle is released, the spring biased vertical latching bar 74 moves into engagement with the appropriate keeper notch on the connecting link 52 and the seat adjuster is secured in that position.

When it is desired to move the seat downwardly, the handle 62 is moved forward to release latching bar 74 from the keeper notch and the normal weight of a person on the seat will move the seat in a downward direction until the desired position is reached, at which time the handle 62 is released and the spring biased vertical latching bar 74 moves into engagement with the appropriate keeper notch on the connecting link 52 to secure the seat in the selected position.

Counterbalance springs 104, 106 are provided at the front and rear of the seat adjuster and are designed to counterbalance the weight of the seat and seat adjuster to provide ease of movement during vertical adjustment.

The front counterbalance spring 104 is retained in place against the front upper supporting channel 32 by two fingers 108, 110 which are cut from the web section 36 of the front upper supporting channel 32 and are bent downward a 90° angle from the web section. The rear counterbalance spring 106 is similarly positioned by two fingers 112, 114 made in a similar manner from the web section 40 of rear supporting channel 34. The lower end portion of the front counterbalance spring 104 is positioned on a support plate 116 which has a circular positioning ring 118 secured at right angles to support plate 116 in such a manner that the counterbalance spring 104 will fit around it on the support plate. The counterbalance spring 106 has a similar support plate 120 with a circular positioning ring 122 at right angles to plate 120 to position the rear counterbalance spring 106.

The support plates 116, 120 are positioned in slots 124, 126 cut in floor stools 18, 20. When the support plates 116, 120 have been placed in position, tabs 128, 130 are bent back to their normal position and retain spring support plates 116, 120 in the slots 124, 126.

While but one embodiment of the invention has been shown and described, it will be evident that numerous changes and modifications may be made therein. It is, therefore, to be understood that it is not intended to limit the invention to the embodiments shown but only by the scope of the claims which follow.

I claim:

1. A vehicle seat adjuster which includes an upper support member adapted to support a vehicle seat and a lower support member adapted to be supported on a vehicle floor, a linkage connected between said members to allow vertical adjustment therebetween, compression springs between said members tending to separate said upper and lower members and manually operated latching means to prevent vertical movement of said upper member relative to said lower member.

2. The apparatus of claim 1 which further includes means for manually adjusting said upper support member in a fore and aft direction relative to said lower support member and manually operated locking means to prevent horizontal movement of said upper support member relative to said lower support members.

3. A seat adjuster comprising, in combination, a pair of longitudinally spaced members adapted to support a vehicle seat and adapted to be fixedly secured to a vehicle floor, means for adjusting the seat horizontally in a fore and aft direction, manually operated locking means to lock the said horizontal adjusting means and prevent movement thereof, front and rear bellcrank linkages interconnecting the said members for relative vertical movement, front and rear compression springs to counterbalance the weight of the seat, a connecting link formed with keeper notches and connected between the front and rear bellcrank linkages for controlling movement of said linkages, and a locking bar mounted on the seat supporting member and adapted to seat in a selected keeper notch in said connecting link to secure said vertical linkage in a desired position.

4. A seat adjuster for adjustably supporting a vehicle seat on a vehicle floor comprising; a first member secured to said floor, a second member secured to said seat, linkage means connected between said members for vertically adjusting one member relative to the other member, said linkage means including a front link and a rear link pivotally connected between the front and rear of said members, respectively, a connecting link having one end pivotally connected to said front link and the other end pivotally connected to said rear link for controlling movement of said links, manually operable latching means disposed in the space between said first and second members and between said front and rear links for securing said members from relative movement therebetween, said latching means including a plurality of keeper notches on said connecting link, a locking bar slidably secured to one of said members for movement into and out of engagement with said keeper notches for securing said connecting link from movement when so engaged.

5. A seat adjuster unit for providing vertical and horizontal adjustment of the position of a seat comprising; an upper support member including first and second mating channel members, said first channel members being movable axially with respect to said second channel members, a seat fixed to said first channel member for movement therewith, spaced downwardly depending front and rear brackets fixed to said second channel member, a lower support member fixed against movement, and including spaced upwardly extending front and rear support arms formed thereon, a first link connecting said front bracket to said front arm, a second link connecting said rear bracket to said rear arm, a third connecting link connecting said front link to said second link, said rear bracket having a portion thereof extending forwardly into the space between said front and rear brackets and depending downwardly beneath said upper support member into the space between said upper and lower support members and between said front and rear links, latching means carried by said rear bracket, said latching means including a manually movable lock bar, a plurality of keeper notches formed in said third link for selectively securing said lock bar to lock said seat in selected vertical positions, a plate fixed to said channel member of said upper support member, a plurality of keeper notches on said plate, said lock mechanism also including a second manually movable lock bar cooperating with said last mentioned keeper notches for locking said seat in selected horizontal position.

6. A seat adjuster unit for providing vertical and horizontal adjustment for a seat comprising; an elongated upper support member secured to said seat, an elongated lower support member secured from movement, one of said members including a horizontal adjusting mechanism for adjusting said seat horizontally fore and aft, linkage means including a front and a rear link pivotally connecting the front and rear ends of said members, respectively, for adjusting said seat vertically, a connecting link between said links having one end pivotally connected to said front link and the other end pivotally connected to said rear link for controlling movement of said links, a plurality of keeper notches on said connecting link, a locking means including a first and a second lock bar secured to one of said members for sliding movement between a locked position and an unlocked position, means biasing said lock bars to locked position, said first bar in locked position cooperating with one of said keeper notches on said connecting link for securing said seat in selected positions of vertical adjustment, a plate on said horizontal adjusting means having keeper notches for cooperating with said second lock bar for securing said seat in selected positions of horizontal adjustment, and a handle for selectively and independently moving said lock bars to unlocked positions.

References Cited in the file of this patent

UNITED STATES PATENTS

| | | |
|---|---|---|
| 699,428 | Truslow | May 6, 1902 |
| 2,076,309 | Whedon | Apr. 6, 1937 |
| 2,609,029 | Haberstump | Sept. 2, 1952 |